United States Patent

Onoda et al.

[11] Patent Number: 5,948,537
[45] Date of Patent: Sep. 7, 1999

[54] SUBSTRATE FOR A PLASMA DISPLAY PANEL AND LOW MELTING POINT GLASS COMPOSITION

[75] Inventors: Hitoshi Onoda; Yumiko Aoki; Tsuneo Manabe, all of Yokohama; Masamichi Tanida, Koriyama, all of Japan

[73] Assignee: Asahi Glass Company Ltd., Tokyo, Japan

[21] Appl. No.: 09/047,313

[22] Filed: Mar. 25, 1998

[30] Foreign Application Priority Data

Mar. 28, 1997 [JP] Japan .................................... 9-078438
Oct. 14, 1997 [JP] Japan .................................... 9-280903
Feb. 5, 1998 [JP] Japan .................................. 10-024838

[51] Int. Cl.$^6$ .................................................. B32B 17/00
[52] U.S. Cl. ........................ 428/426; 428/428; 428/472; 501/49; 501/52; 501/76
[58] Field of Search ................................ 501/49, 52, 76; 428/426, 428, 472

[56] References Cited

U.S. PATENT DOCUMENTS 3,841,883 10/1974 Sherk ........................................ 501/76
3,873,330 3/1975 Sherk ........................................ 501/76

FOREIGN PATENT DOCUMENTS

| 47-4318 | 3/1972 | Japan . |
| 47-6318 | 4/1972 | Japan . |
| 47-6319 | 4/1972 | Japan . |
| 47-7275 | 4/1972 | Japan . |
| 48-13080 | 2/1973 | Japan . |
| 50-23414 | 3/1975 | Japan . |
| 53-30269 | 3/1978 | Japan . |
| 60-11246 | 1/1985 | Japan . |
| 60-101839 | 6/1985 | Japan . |
| 61-110936 | 5/1986 | Japan . |
| 6-333503 | 12/1994 | Japan . |
| 7-105855 | 4/1995 | Japan . |
| 7-176269 | 7/1995 | Japan . |
| 2503072 | 3/1996 | Japan . |
| 8-77930 | 3/1996 | Japan . |
| 9-50769 | 2/1997 | Japan . |
| 9-102273 | 4/1997 | Japan . |

*Primary Examiner*—Timothy Speer
*Attorney, Agent, or Firm*—Oblon, Spivak, McClelland, Maier & Neustadt, P.C.

[57] ABSTRACT

A substrate for a plasma display panel, having electrodes and a covering material for the electrodes, provided thereon, wherein the covering material is a non-crystallizable glass having a softening point of at most 510° C. and an average thermal expansion coefficient of from $70 \times 10^{-7}$ to $85 \times 10^{-7}$/°C. within a range of from 50 to 350° C.

7 Claims, No Drawings

SUBSTRATE FOR A PLASMA DISPLAY PANEL AND LOW MELTING POINT GLASS COMPOSITION

BACKGROUND OF THE INVENTION

1. Field of the Invention

The present invention relates to a low melting point glass composition suitable for covering and insulating the electrodes for plasma display, and a substrate for a plasma display panel (PDP).

2. Discussion of Background

In recent years, PDP has attracted an attention as a thin flat plate type color display device of large size. In such a display device, thin line electrodes are formed on a glass substrate to let picture elements for an image produce plasma discharge. To secure insulation between these electrodes, to produce a plasma under a stabilized condition and to prevent these electrodes from erosion by the plasma, these electrodes are covered with an insulting glass layer. This glass layer is required to have a thermal expansion characteristic which satisfies a predetermined relation with the glass substrate, to avoid cracking or breakage during the process for preparation of the panel or during the display operation.

Heretofore, various types have been proposed for an insulating glass layer to be used for such covering. JP-A-47-4318 (U.S. patent application Ser. No. 61842, filed Aug. 6, 1970), JP-A-47-6318 (U.S. Pat. Nos. 3,989,877 and 3,634,791), JP-A-47-6319 (U.S. Pat. Nos. 3,918,136, 3,976, 823 and 3,896,323) and JP-A-47-7275 (U.S. Pat. Nos. 3,863,089 and 3,846,171) disclose a composition comprising 73.3 wt % of PbO, 13.4 wt % of $B_2O_3$, and 13.3 wt % of $SiO_2$.

JP-A-48-13080 proposes a low melting point glass containing boric acid and lithium oxide and not containing lead.

JP-A-50-23414 proposes a glass composition comprising PbO, $B_2O_3$, $SiO_2$ and $Al_2O_3$ and further contains at least one of CaO and MgO, and it exemplifies a composition comprising from 62.4 to 69.6 wt % of PbO, from 5.8 to 13.6 wt % of $SiO_2$, from 13.6 to 20.0 wt % of $B_2O_3$, from 0.2 to 1.0 wt % of $Al_2O_3$, from 0.0 to 5.0 wt % of MgO and from 0.0 to 6.0 wt % of CaO.

JP-A-53-30269 proposes a low melting point glass having a high lead content and having a small amount of lithium oxide incorporated, and it exemplifies a composition comprising 73 wt % of PbO, 12 wt % of $SiO_2$, 12 wt % of $B_2O_3$, 2.7 wt % of $Al_2O_3$ and 0.3 wt % of $Li_2O$.

JP-A-60-11246 (EP131389) proposes a glass composition comprising $SiO_2$, $B_2O_3$, ZnO, $Al_2O_3$, $Na_2O$, $K_2O$, CaO and $Li_2O$, and it exemplifies a composition comprising 20 wt % of $SiO_2$, 40 wt % of ZnO, 20 wt % of $B_2O_3$, 5 wt % of $Al_2O_3$, 7 wt % of $Na_2O$, 4 wt % of $K_2O$, and 1 wt % of $Li_2O$.

JP-A-60-101839 proposes a low melting point glass having lead oxide limited to at most 60 wt % in order to prevent corrosion of thin aluminum electrodes, and it exemplifies a composition comprising from 43 to 50 wt % of PbO, from 8 to 15 wt % of $B_2O_3$ from 15 to 30 wt % of $SiO_2$, and from 5 to 25 wt % of $Al_2O_3$.

JP-A-61-110936 proposes a dielectric having a PbO content of from 40 to 50%.

Japanese Patent No. 2503072 proposes a covering made of two layer films, wherein a low melting glass containing, as the main component, PbO having ZnO added thereto, and a low melting point glass containing, as the main component, PbO having $Ce_2O$ added thereto, are laminated.

JP-A-6-333503 proposes a low melting point glass having lead oxide limited to at most 60 wt % in order to prevent a reaction with a tin oxide type oxide electrode, and it exemplifies a composition comprising 60 wt % of PbO, 10 wt % of $B_2O_3$, 25 wt % of $SiO_2$ and 5 wt % of other inorganic materials.

JP-A-7-176269 proposes to cover with a first dielectric layer formed with a thick film paste containing, as the main component, a low melting point glass, and with a second dielectric layer formed with a thin film paste containing, as the main component, a low melting point glass having a softening point lower than the first dielectric layer and fired at least at a temperature whereby the paste is softened to form a smooth surface layer.

JP-A-7-105855 proposes to cover with dielectric layers which comprise a lower glass layer formed by firing a first glass material at a temperature lower than its softening point, and an upper glass layer formed by firing a second glass material at a temperature higher than its softening point.

JP-A-8-77930 proposes to cover with a dielectric layer composed of a low melting point glass having a dielectric constant of at most 8 and containing $Na_2O$ and $B_2O_3$.

JP-A-9-50769 proposes to cover with a dielectric layer composed of a ZnO type glass material containing substantially no lead.

JP-A-9-102273 proposes to transfer a film-forming material layer containing a glass powder which is a mixture comprising from 60 to 90 wt % of ZnO, from 5 to 20 wt % of $B_2O_3$ and from 5 to 20 wt % of $SiO_2$, to the surface of a glass substrate having electrodes fixed thereon.

As the glass material for a substrate for PDP, soda lime silicate glass is, for example, known, and its average thermal expansion coefficient is from about $80\times10^{-7}$ to $90\times10^{-7}/°C$. within a range of from 50 to 350° C. To form a glass layer on such a substrate, it is believed advisable to employ a low melting point glass having an average thermal expansion coefficient within a range of from $70\times10^{-7}$ to $85\times10^{-7}/°C$. within a range of from 50 to 350° C. in order to secure the strength of the substrate.

To form such an insulating glass layer, it is possible to employ a method of using a vacuum process such as a vapor deposition method or a sputtering method, or a chemical forming method such as a sol-gel method. However, such a method has a problem such that the forming efficiency is poor, thus leading to high costs, or the reliability of the formed layer is low.

Therefore, it is common to employ a method for forming such an insulating glass layer by coating a low melting point glass powder, followed by firing. However, the glass layer thus obtained has low transparency. If the transparency of the glass layer used for the front substrate of PDP is low, it will be impossible to effectively take out plasma-induced fluorescent lights, whereby the display quality is likely to be low.

SUMMARY OF THE INVENTION

The present invention has been made to solve the above problems, and it provides a substrate for a plasma display panel, having electrodes and a covering material for the electrodes, provided thereon, wherein the covering material is a non-crystallizable glass having a softening point of at most 510° C. and an average thermal expansion coefficient of from $70\times10^{-7}$ to $85\times10^{-7}/°C$. within a range of from 50 to 350° C.

Further, the present invention provides a non-crystallizable low melting point glass composition consisting essentially of, as represented by oxides, from 52 to 68 wt % of $PbO+Bi_2O_3$ from 14 to 28 wt % of $B_2O_3$, from 0 to 5 wt % of $SiO_2$, from 6 to 23 wt % of ZnO, from 0 to 8 wt % of $Al_2O_3$, from 0 to 5 wt % of $CeO_2$, and from 0 to 5 wt % of $SnO_2$.

DETAILED DESCRIPTION OF THE PREFERRED EMBODIMENTS

As a result of an extensive research, the present inventors have found that the low transparency of the above-mentioned insulating glass layer is attributable to the following three causes, i.e. (1) the presence of fine bubbles taken into the glass layer during the firing process, (2) crystallization of glass components which takes place during the firing, and (3) coloring of the glass due to carbon formed by carbonization of an organic vehicle during the firing and remained in the glass without being oxidized.

On the basis of the above discovery, according to one aspect of the present invention, the problem of deterioration of the transparency of the glass layer is solved by using a non-crystallizable glass having a softening point of at most 510° C. and an average thermal expansion coefficient of from $70 \times 10^{-7}$ to $85 \times 10^{-7}/°C$. within a range of from 50 to 350° C., as a covering material for electrodes provided on the substrate.

The properties of the electrode material tend to deteriorate when the material is heated at a temperature of about 600° C. or higher. Accordingly, firing of the glass layer has to be carried out at a temperature of at most about 600° C. In the present invention, a low melting point glass having a softening point of at most 510° C. is employed, whereby the low melting point glass can adequately be softened to flow during the firing, and included bubbles will be permitted to rise and removed.

Further, in the present invention, high transparency of the glass layer is secured by employing the non-crystallizable glass as the covering material for the electrodes. Here, the non-crystallizable glass is meant for a glass which is free from precipitation of crystals when it is maintained at a temperature of at most 600° C. for 30 minutes.

Further, it is possible to prevent deterioration in the strength of the substrate after formation of the glass layer by adjusting the average thermal expansion coefficient of the glass layer within a range of from $70 \times 10^{-7}$ to $85 \times 10^{-7}/°C$. within a range of from 50 to 350° C.

However, it is not easy to obtain a glass satisfying the above properties. Namely, to lower the softening point, it is required to incorporate a component (such as PbO or $B_2O_3$) which functions as a flux, in a relatively large amount, and in order to properly adjust the thermal expansion coefficient to the substrate, it is at the same time necessary to incorporate a component (such as ZnO) which reduces the thermal expansion. On the other hand, these components tend to function as crystal-precipitating components in a temperature range close to 600° C., whereby it is difficult to obtain a non-crystallizable glass.

As a result of a research, the present inventors have found a lead borate type glass composition which can be used for such a purpose. Namely, it is a non-crystallizable low melting point glass composition consisting essentially of, as represented by oxides, from 52 to 68 wt % of $PbO+Bi_2O_3$, from 14 to 28 wt % of $B_2O_3$, from 0 to 5 wt % of $SiO_2$, from 6 to 23 wt % of ZnO, from 0 to 8 wt % of $Al_2O_3$, from 0 to 5 wt % of $CeO_2$, and from 0 to 5 wt % of $SnO_2$. Now, the respective components of this composition will be described. Hereinafter, "%" means "wt %" unless otherwise specified.

PbO or $Bi_2O_3$ is a component essential to lower the melting point of the glass. At least one of them is incorporated, and the total amount is preferably from 52 to 68%. If their contents are less than 52% in the total amount, the softening temperature of the glass tends to be high, and it tends to be difficult to form a sufficiently transparent layer at a temperature of at most about 600° C. Preferably, the total amount is at least 53%. On the other hand, if their contents exceed 68% in the total amount, the expansion coefficient of the low melting point glass tends to be large, and the glass layer tends to be colored with a yellow color. Preferably, the total amount is at most 64%. Especially, $Bi_2O_3$ has a strong tendency to color the glass layer with a yellow color, and in order to obtain a colorless transparent glass layer, the content of $Bi_2O_3$ is preferably at most 40%.

$B_2O_3$ is a component which makes a PbO type low melting point glass a stable glass, and it is preferably contained in an amount of from 14 to 28%. If the content is less than 14%, the low melting point glass tends to crystallize during the firing, whereby the transparency is likely to be impaired. Further, the amount of PbO contained, will relatively be large, whereby the expansion coefficient of the low melting point glass is likely to be large. If the content exceeds 28%, the amount of PbO contained will relatively be small, whereby the softening point of the low melting point glass is likely to be high.

$SiO_2$ is not an essential component, but may be incorporated to make the PbO type low melting point glass a stable glass. If it exceeds 5%, the softening temperature of the glass tends to be high, and crystallization of the low melting point glass during the firing tends to be promoted, whereby the transparency is likely to be impaired. Further, the amount of PbO contained, tends to be relatively large, whereby the expansion coefficient of the low melting glass is likely to be large.

ZnO is a component to reduce the thermal expansion coefficient of the low melting point glass, and it is preferably contained in an amount of from 6 to 23%. If the content is less than 6%, the thermal expansion coefficient of the low melting point glass is likely to be large. It is preferably at least 9%. If the content exceeds 23%, the low melting point glass tends to crystallize during the firing, whereby the transparency is likely to be impaired. Preferably, it is at most 21%.

$Al_2O_3$ is not an essential component, but may be incorporated to make the PbO type low melting point glass a stable glass. If it exceeds 8%, crystallization of the low melting point glass during the firing tends to be promoted, whereby the transparency is likely to be impaired.

$CeO_2$ is not an essential component, but may be incorporated to oxidize carbon remaining in the glass thereby to prevent coloring of the glass. If it exceeds 5 wt %, yellowing of low melting point glass is likely to be accelerated, whereby the transparency is likely to be impaired.

$SnO_2$ is not an essential component, but may be incorporated to oxidize carbon remaining in the glass thereby to prevent coloring of the glass. If it exceeds 5 wt %, the viscosity of low melting point glass tends to increase, whereby rising of bubbles tends to be difficult, and the transparency is likely to be impaired.

In addition to these components, MgO, CaO, SrO, BaO, $La_2O_3$, $TiO_2$, $ZrO_2$, etc. may suitably be incorporated to the above glass composition within a range not to impair the effects of the present invention (preferably, each being at most 10% in the low melting point glass composition) in order to adjust the thermal expansion coefficient, chemical durability, softening point and transparency of the low melting point glass and the stability of the glass. Further, an alkali metal oxide such as $Li_2O$, $Na_2O$ or $K_2O$, or a halogen component such as F, may further be added as a component to lower the softening point of the glass, within a range not to impair the electrical properties, etc. (preferably each being at most 10% in the low melting point glass composition).

The substrate of the present invention has high transparency. Specifically, in a case where a glass layer having a thickness of from 25 to 30 μm is formed on a soda lime silicate glass having a thickness of 2.8 mm, the transmittance of visible lights by standard illuminant C can be made at least 80%.

As a method for forming an insulating covering by the low melting point glass layer in the present invention, it is common to employ a method wherein the glass is pulverized to a fine powder, this fine powder glass is dispersed and mixed in an organic solvent to form an ink, and the ink is coated on a sheet glass having electrodes formed thereon, by a method such as screen printing, followed by drying the organic solvent and then firing to sinter the low melting point glass densely. However, the method is not particularly limited to such a method, so long as it is capable of forming a glass layer which accomplishes the object of the present invention.

Now, the present invention will be described in further detail with reference to Examples. However, it should be understood that the present invention is by no means restricted by such specific Examples.

EXAMPLES 1 TO 23

Lead oxide, bismuth oxide, boric anhydride, silica sand, zinc oxide, stannic oxide, ceric oxide and aluminum oxide were mixed to obtain a composition having the glass composition (wt %) as shown in the following Tables, then melted in a platinum crucible at 1,300° C. for 1 hour and formed into a thin sheet glass, followed by pulverization by a ball mill to obtain a low melting point glass powder. The softening point (°C.) and the average linear thermal expansion coefficient ($10^{-7}$/°C.) within a range of from 50 to 350° C., of such a glass, are shown in the columns for "Glass softening point" and "Glass thermal expansion coefficient" in the Tables, respectively.

Examples Nos. 1 to 3 represent Working Examples of the present invention, and Example Nos. 14 to 23 represent Comparative Examples. Example Nos. 14, 21 and 22 represent Examples in which the average linear thermal expansion coefficient exceeds $85 \times 10^{-7}$/°C. within a range of from 50 to 350° C. Example Nos. 15 and 20 represent Examples in which the softening point exceeds 510° C. Example Nos. 16 to 19 and 23 represent Examples for crystallizable glasses in which crystals precipitate during the firing. In the column for "Crystallizability" in the Tables, "Yes" means crystallizable glass, and "No" means non-crystallizable glass.

100 g of this powder was kneaded with 25 g of an organic vehicle having 7 wt % of ethyl cellulose dissolved in diethylene glycol monobutyl ether acetate, to obtain a paste-like ink.

Then, a soda lime silicate glass substrate having a size of 100 mm×100 mm and a thickness of 2.8 mm, was prepared, and in a region of 50 mm×50 mm at substantially the center of one side of the substrate, the above paste was uniformly screen-printed and dried at 120° C. for 10 minutes. Such a substrate was heated at a temperature-rising rate of 10° C./min to the temperature (°C) as identified in the column for "Firing temperature" in the Tables and maintained for 30 minutes for firing.

The thickness (μm) of the low melting point glass layer after the firing was measured and indicated in the column for "Thickness of low melting point glass layer". Further, the transmittance "%" of visible lights by standard illuminant C was measured and indicated in the column for "Light transmittance of substrate after firing". This value is preferably at least 80%.

Further, the region covered by the low melting point glass of the fired glass sheet, was cut out with a width of 15 mm, and the cross-section was optically polished and inspected in the cross-sectional direction by a polarization microscope (interference meter), whereby the strain stress (kg/cm²) of the surface portion of the glass substrate was calculated by a photoelasticity method and indicated in the column for "Strain in glass substrate". The symbol "+" indicates a compression stress, and the symbol "−" indicates a tensile stress. This value is preferably from −12 to +12 kg/cm².

It is evident that all of the substrates in the Working Examples of the present invention have a visible light transmittance of at least 80% and thus have high transparency. Further, the strain in the glass substrate is within a range of from −12 to +12 kg/cm², thus indicating good compatibility in the thermal expansion coefficient between the substrate and the glass layer. Example 6 is a Working Example of the present invention, but the composition is outside the preferred range, whereby the strain in the glass substrate is slightly large within a permissible range.

TABLE 1

|  | Examples | | | | |
| --- | --- | --- | --- | --- | --- |
|  | 1 | 2 | 3 | 4 | 5 |
| Glass Composition |  |  |  |  |  |
| PbO | 56.5 | 62.4 | 31.1 | 56.0 | 55.6 |
| $Bi_2O_3$ | 0.0 | 0.0 | 32.4 | 0.0 | 0.0 |
| PbO + $Bi_2O_3$ | 56.5 | 62.4 | 63.5 | 56.0 | 55.6 |
| $B_2O_3$ | 20.5 | 27.8 | 14.6 | 17.4 | 17.3 |
| $SiO_2$ | 2.5 | 0.0 | 4.2 | 5.0 | 2.5 |
| ZnO | 20.5 | 9.8 | 17.0 | 20.4 | 20.3 |
| $Al_2O_3$ | 0.0 | 0.0 | 0.0 | 0.0 | 4.2 |
| $CeO_2$ | 0.0 | 0.0 | 0.7 | 0.0 | 0.0 |
| $SnO_2$ | 0.0 | 0.0 | 0.0 | 1.2 | 0.0 |
| Glass softening point | 492 | 499 | 493 | 500 | 487 |
| Glass thermal expansion coefficient | 77 | 78 | 80 | 74 | 74 |
| Thickness of low melting point glass layer | 28 | 29 | 29 | 28 | 28 |
| Firing temperature | 580 | 580 | 580 | 580 | 580 |
| Light transmittance of substrate after firing | 86 | 86 | 85 | 82 | 86 |
| Strain in glass substrate | +2 | +3 | +4 | −1 | +2 |
| Crystallizability | No | No | No | No | No |

TABLE 2

|  | Examples | | | | |
| --- | --- | --- | --- | --- | --- |
|  | 6 | 7 | 8 | 9 | 10 |
| Glass Composition |  |  |  |  |  |
| PbO | 69.1 | 67.6 | 52.9 | 61.7 | 63.7 |

TABLE 2-continued

|  | Examples | | | | |
| --- | --- | --- | --- | --- | --- |
|  | 6 | 7 | 8 | 9 | 10 |
| $Bi_2O_3$ | 0.0 | 0.0 | 0.0 | 0.0 | 0.0 |
| $PbO + Bi_2O_3$ | 69.1 | 67.6 | 52.9 | 61.7 | 63.7 |
| $B_2O_3$ | 10.8 | 21.1 | 21.0 | 22.0 | 18.5 |
| $SiO_2$ | 13.9 | 4.6 | 2.6 | 2.4 | 2.3 |
| ZnO | 6.2 | 6.2 | 22.8 | 9.6 | 7.7 |
| $Al_2O_3$ | 0.0 | 0.0 | 0.0 | 4.0 | 7.8 |
| $CeO_2$ | 0.0 | 0.0 | 0.7 | 0.3 | 0.0 |
| $SnO_2$ | 0.0 | 0.5 | 0.0 | 0.0 | 0.0 |
| Glass softening point | 480 | 479 | 495 | 484 | 480 |
| Glass thermal expansion coefficient | 84 | 85 | 73 | 80 | 80 |
| Thickness of low melting point glass layer | 29 | 29 | 28 | 28 | 29 |
| Firing temperature | 580 | 580 | 580 | 580 | 560 |
| Light transmittance of substrate after firing | 83 | 86 | 82 | 86 | 83 |
| Strain in glass substrate | +12 | +10 | −1 | +4 | +4 |
| Crystallizability | No | No | No | No | No |

TABLE 3

|  | Examples | | | | |
| --- | --- | --- | --- | --- | --- |
|  | 11 | 12 | 13 | 14 | 15 |
| Glass Composition |  |  |  |  |  |
| PbO | 61.3 | 66.9 | 67.4 | 68.8 | 51.2 |
| $Bi_2O_3$ | 0.0 | 0.0 | 0.0 | 0.0 | 0.0 |
| $PbO + Bi_2O_3$ | 61.3 | 66.9 | 67.4 | 68.8 | 51.2 |
| $B_2O_3$ | 21.9 | 20.9 | 15.4 | 13.4 | 19.1 |
| $SiO_2$ | 0.0 | 2.3 | 2.9 | 11.6 | 11.0 |
| ZnO | 12.8 | 6.1 | 10.5 | 6.3 | 18.7 |
| $Al_2O_3$ | 4.0 | 3.8 | 3.8 | 0.0 | 0.0 |
| $CeO_2$ | 0.0 | 0.0 | 0.0 | 0.0 | 0.0 |
| $SnO_2$ | 0.0 | 0.0 | 0.0 | 0.0 | 0.0 |
| Glass softening point | 473 | 470 | 440 | 469 | 527 |
| Glass thermal expansion coefficient | 80 | 85 | 84 | 86 | 68 |
| Thickness of low melting point glass layer | 27 | 29 | 28 | 29 | 28 |
| Firing temperature | 560 | 560 | 540 | 580 | 580 |
| Light transmittance of substrate after firing | 84 | 85 | 85 | 84 | 42 |
| Strain in glass substrate | +4 | +9 | +8 | +15 | −14 |
| Crystallizability | No | No | No | No | No |

TABLE 4

|  | Examples | | | | |
| --- | --- | --- | --- | --- | --- |
|  | 16 | 17 | 18 | 19 | 20 |
| Glass Composition |  |  |  |  |  |
| PbO | 56.8 | 56.1 | 55.9 | 55.6 | 50.1 |
| $Bi_2O_3$ | 0.0 | 0.0 | 0.0 | 0.0 | 0.0 |
| $PbO + Bi_2O_3$ | 56.8 | 56.1 | 55.9 | 55.6 | 50.1 |
| $B_2O_3$ | 14.8 | 20.4 | 14.5 | 11.6 | 21.9 |
| $SiO_2$ | 7.7 | 1.3 | 5.0 | 5.0 | 5.4 |
| ZnO | 20.7 | 22.2 | 23.8 | 27.1 | 21.9 |
| $Al_2O_3$ | 0.0 | 0.0 | 0.0 | 0.0 | 0.0 |
| $CeO_2$ | 0.0 | 0.0 | 0.8 | 0.7 | 0.7 |
| $SnO_2$ | 0.0 | 0.0 | 0.0 | 0.0 | 0.0 |

TABLE 4-continued

|  | Examples | | | | |
| --- | --- | --- | --- | --- | --- |
|  | 16 | 17 | 18 | 19 | 20 |
| Glass softening point | 497 | 472 | 482 | 469 | 520 |
| Glass thermal expansion coefficient | 75 | 83 | 75 | 72 | 71 |
| Thickness of low melting point glass layer | 28 | 27 | 28 | 29 | 29 |
| Firing temperature | 580 | 580 | 580 | 580 | 580 |
| Light transmittance of substrate after firing | 74 | 77 | 68 | 71 | 47 |
| Strain in glass substrate | −4 | +10 | 0 | −3 | −3 |
| Crystallizability | Yes | Yes | Yes | Yes | No |

TABLE 5

|  | Examples | 21 | 22 | 23 |
| --- | --- | --- | --- | --- |
| Glass composition | PbO | 72.8 | 69.1 | 61.6 |
|  | $Bi_2O_3$ | 0.0 | 0.0 | 0.0 |
|  | $PbO + Bi_2O_3$ | 72.8 | 69.1 | 61.6 |
|  | $B_2O_3$ | 7.6 | 10.8 | 19.2 |
|  | $SiO_2$ | 13.1 | 16.3 | 4.7 |
|  | ZnO | 5.9 | 3.2 | 6.4 |
|  | $Al_2O_3$ | 0.0 | 0.0 | 8.1 |
|  | $CeO_2$ | 0.6 | 0.6 | 0.0 |
|  | $SnO_2$ | 0.0 | 0.0 | 0.0 |
| Glass softening point |  | 458 | 445 | 500 |
| Glass thermal expansion coefficient |  | 92 | 89 | 76 |
| Thickness of low melting point glass layer |  | 29 | 28 | 28 |
| Firing temperature |  | 580 | 580 | 580 |
| Light transmittance of substrate after firing |  | 84 | 86 | 64 |
| Strain in glass substrate |  | +15 | +13 | 0 |
| Crystallizability |  | No | No | Yes |

As described in the foregoing, the substrate of the present invention has high transparency, whereby a strain in the substrate resulting from formation of an insulating covering is little, and thus it is useful for PDP.

Further, the low melting point insulating glass composition of the present invention exhibits a very high light transmittance by firing at a low temperature of at most about 600° C., and the thermal expansion characteristic agrees with the soda lime glass substrate, whereby no substantial strain will be formed, and it is thereby possible to effectively suppress formation of cracks or breakage of the substrate during the firing. Thus, it is very useful as a covering material for electrodes for the front panel of PDP.

Further, an insulating glass layer can efficiently be formed by coating a powder of the low melting point insulating glass composition of the present invention, followed by firing, as compared with the sol-gel method or the method of employing a vacuum process, whereby the cost can be reduced.

What is claimed is:

1. A non-crystallizable low melting point glass composition consisting essentially of, as represented by oxides, from 52 to 68 wt % of $PbO+Bi_2O_3$, from 14 to 28 wt % of $B_2O_3$, from 0 to 5 wt % of $SiO_2$, from 6 to 23 wt % of ZnO, from 0 to 8 wt % of $Al_2O_3$, from 0 to 5 wt % of $CeO_2$, and from 0 to 5 wt % of $SnO_2$.

2. The glass composition according to claim 1, which has a softening point of at most 510° C.

3. The glass composition according to claim 1, which has an average thermal expansion coefficient of from $70 \times 10^{-7}$ to $85 \times 10^{-7}/°C$. within a range of from 50 to 350° C.

4. The glass composition according to claim 1, which is used for covering electrodes for plasma display.

5. A substrate for a plasma display panel, having electrodes and a covering material for the electrodes, provided thereon, wherein the covering material is a non-crystallizable glass having a softening point of at most 510° C. and an average thermal expansion coefficient of from $70 \times 10^{-7}$ to $85 \times 10^{-7}/°C$. within a range of from 50 to 350° C., wherein the non-crystallizable glass consists essentially of, as represented by oxides, from 52 to 68 wt % of $PbO+Bi_2O_3$, from 14 to 28 wt % of $B_2O_3$, from 0 to 5 wt % of $SiO_2$, from 6 to 23 wt % of ZnO, from 0 to 8 wt % of $Al_2O_3$, from 0 to 5 wt % of $CeO_2$, and from 0 to 5 wt % of $SnO_2$.

6. The substrate of claim 5, wherein said non-crystallizable glass has a softening point of at most 510° C.

7. The substrate of claim 5, wherein said non-crystallizable glass has an average thermal expansion coefficient of from $70 \times 10^{-7}$ to $85 \times 10^{-7}/°C$. within a range of from 50 to 350° C.

* * * * *